(12) United States Patent
Douskalis et al.

(10) Patent No.: US 7,984,127 B2
(45) Date of Patent: Jul. 19, 2011

(54) DATA MATRIX METHOD AND SYSTEM FOR DISTRIBUTION OF DATA

(75) Inventors: William Douskalis, Centreville, VA (US); Debashis Haldar, Olathe, KS (US); Jesse Money, Shawnee, KS (US); Arun Santharam, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 2316 days.

(21) Appl. No.: 10/411,480

(22) Filed: Apr. 8, 2003

(65) Prior Publication Data

US 2004/0213230 A1    Oct. 28, 2004

(51) Int. Cl.
*G06F 15/16* (2006.01)
*G06F 15/173* (2006.01)

(52) U.S. Cl. .................. 709/223; 709/236; 709/245
(58) Field of Classification Search .............. 709/236
See application file for complete search history.

(56) References Cited

U.S. PATENT DOCUMENTS

| | | | |
|---|---|---|---|
| 5,659,544 A * | 8/1997 | La Porta et al. ............. 370/312 |
| 6,490,264 B1 | 12/2002 | Suzuki |
| 2002/0051518 A1* | 5/2002 | Bondy et al. ................... 379/35 |
| 2002/0062310 A1* | 5/2002 | Marmor et al. .................. 707/3 |
| 2002/0150098 A1* | 10/2002 | Sharony ....................... 370/390 |
| 2003/0120817 A1 | 6/2003 | Ott et al. |
| 2004/0095900 A1 | 5/2004 | Siegel |
| 2004/0143672 A1* | 7/2004 | Padmanabham et al. ..... 709/231 |
| 2004/0148421 A1* | 7/2004 | Achtermann et al. ........ 709/232 |
| 2005/0198359 A1* | 9/2005 | Basani et al. ................ 709/232 |
| 2005/0220094 A1 | 10/2005 | Parker et al. |

FOREIGN PATENT DOCUMENTS

WO    WO 01/99348    12/2001

OTHER PUBLICATIONS

EDS, Whate Paper: OSS Flexibility and Interoperability, "Take a big-picture view of operations support," Nov. 2001.
TimesTen, Inc., TimesTen 5.0, Real-Time Event Processing System, 2003.
Oracle, Oracle9*i* Application Server, An Oracle Business White Paper, Feb. 2003.
Barbara Klein, "An IMS Overview," IBM, Aug. 2001.
Michael Biere and Darien Davis, "Multicast Data Distribution on the AWIPS Local Area Network," http://www-sdd.fsl.noaa.gov/~fxa/publications/19th_IIPS_03/BiereDavis.IPPS03.pdf, printed from the World Wide Web on Jan. 9, 2003.
International Search Report from International Application No. PCT/US04/10462, dated Feb. 26, 2007.
Written Opinion of International Searching Authority from International Application No. PCT/US04/10462, dated Feb. 26, 2007.

* cited by examiner

*Primary Examiner* — Hassan Phillips
*Assistant Examiner* — Tanim M Hossain

(57) ABSTRACT

A method and system for distributing data from one or more main data sources to one or more consumer nodes. An abstract data matrix layer is provided between a producer layer and a consumer layer. A producer node multicasts data updates to selected data matrix nodes in the data matrix layer, and a consumer node registers with the data matrix layer to receive designated data updates. One or more data matrix nodes then serve the requested data updates on the requesting consumer node.

9 Claims, 5 Drawing Sheets

DATA MATRIX METHOD AND SYSTEM FOR DISTRIBUTION OF DATA

BACKGROUND

1. Field of the Invention

The present invention relates to data distribution, and more particularly to replication of data from a master data source to one or more slave or target nodes.

2. Description of Related Art

Conventionally in a replicated database system, a master data source at one location in a network will maintain a database having a defined schema, and one or more other nodes throughout the network will maintain replicated copies of that master database or of some subset thereof. When changes occur in the master database, the master data source may then push those changes via the network to each other node, to facilitate updating of the replicas.

The process of replicating data from the master data source, however, can be cumbersome in a situation where many nodes maintain replicas of the database or where the set of nodes maintaining replicas changes. For example, with many nodes maintaining replicas, the master data source may need to send many update messages (one to each node) every time a change occurs, which could drain resources of the master data source and possibly cause performance and scalability issues.

As another example, the master data source may need to maintain a record of network addresses of each node, so that the master data source can send the update messages to the nodes. As the set of nodes changes (nodes are removed or added), or as their network addresses change, the master data source may therefore need to learn of the change, so as to adjust where it sends database updates.

As still another example, various nodes might maintain a replica of only a particular subset of data maintained in the master database. In that case, the master data source may need to know the database schema of each node, so as to send appropriate updates to the node. As the database schema of a given node changes, the master data source may then need to learn of that change, so as to adjust its updates accordingly.

And as another example, a network node might maintain a replica of data from multiple master data sources. If the master data sources change locations or change their database schemas, then such a node might lose its links with the master databases, and replication might fail.

SUMMARY

An exemplary embodiment of the present invention is directed to an improved method and system for data distribution.

In one respect, for instance, the exemplary embodiment may take the form of a data distribution system that includes (i) a producer layer, (ii) a data matrix layer and (iii) a consumer layer. The producer layer includes a number of producer nodes, each of which maintaining a respective database, and the data matrix layer includes a plurality of data matrix nodes, each of which receives data sets from the producer layer and stores the data sets in data storage.

More particularly, each producer node (i) instructs a subset of the data matrix nodes to listen to a given multicast address and (ii) thereafter sends an update message to the given multicast address for receipt by the data matrix nodes of the subset. The update message carries multiple data sets and, for each data set, a specification that indicates to each recipient data matrix node whether the recipient data matrix node should take and store the data set.

The specification for a given data set could be a delimiter set forth in conjunction with the data set. Further, in various embodiments, the specification could be an identification of one or more data matrix nodes that should take and store the data set. Alternatively, the specification could be an identification of the data set, and one or more data matrix nodes could have been instructed to take and store that data set.

Further, each consumer node of the consumer layer may multicast a registration message to the data matrix nodes, seeking given data. Upon receipt of the registration message, a data matrix node may then determine if it maintains and has some or all of the requested data. If so, the data matrix node may then responsively send the data to the requesting consumer node. Further, the data matrix node would preferably store the request and, upon later receiving additional instances of the requested data from the producer layer, would forward that additional data to the requesting consumer node.

In another respect, the exemplary embodiment may take the form of a method of distributing data over a network from a data source to multiple data matrix nodes (also referred to as "host nodes"). The method may involve instructing each data matrix node to detect network traffic that is destined to a given multicast address. Further, the method may involve multicasting, from the data source to the given multicast address, a data packet that includes multiple data sets and that includes for each data set a specification that indicates to at least one recipient data matrix node whether the recipient data matrix node should take and store the data set.

In this regard, the specifications for various data sets will differ. For instance, the specification for one data set might indicate that a particular data matrix node should receive the data set, while the specification for another data set may indicate that two other data matrix nodes should receive the other data set.

In this exemplary embodiment, the data packet may include a header section and a payload section. The method may then further involve including the multicast address in the header section (as a destination address), and including the multiple data sets and specifications in the payload section. Further, the specification for a given data set could take the form of a delimiter that is set forth in conjunction with the data set, such as just before the data set. Such a delimiter could identify one or more recipient data matrix nodes and/or could identify the data set by name.

The method of distributing data may then further involve each data matrix node receiving the data packet that has been multicast to the multicast address, and, for at least one data set in the packet, (i) making a determination of whether the specification for the data set indicates that the data matrix node should take and store the data set and (ii) taking and storing the data set if the determination is that the specification for the data set indicates that the data matrix node should take and store the data set.

In another respect, the exemplary embodiment may take the form of a method for communicating data in a network (where the network could be comprised of one or more networks). The method may involve a consumer node multicasting a blanket registration message to a multicast group of which multiple data matrix nodes are members, with the blanket registration message identifying the consumer node and defining a request for data. Each of the data matrix nodes could then receive and read the blanket registration message and could determine whether it maintains and has the requested data. At least one of the data matrix nodes that determines that it has the requested data may then respond to the registration message by sending the requested data to the consumer node identified in the registration message.

Further, at least one of the data matrix nodes may maintain a record of the consumer node's request and may thereafter receive additional data, determine that the additional data falls within the requested, and responsively send the additional data along to the consumer node.

More specifically, the method may involve carrying out the following functions:

(i) instructing each data matrix node of a plurality of data matrix nodes to detect network traffic that is destined to a given multicast address, (ii) multicasting, from a producer node to the given multicast address, a data packet that includes a plurality of data sets and that includes, for each data set, a specification that indicates to a recipient data matrix node whether the recipient data matrix node should take and store the data set, wherein a first specification for a first data set in the packet differs from a second specification for a second data set in the packet;

(iii) each data matrix node of the plurality of data matrix nodes receiving the data packet multicast to the multicast address, and each data matrix node taking and storing each data set having a specification that indicates the data matrix node should take and store the data set;

(iv) multicasting, from the consumer node to a multicast group of which the plurality of data matrix nodes are members, a blanket registration message that identifies the consumer node and that defines a request for data;

(v) each of the data matrix nodes making a determination of whether it maintains the requested data and, if so, whether it has the requested data; and (vi) at least one of the data matrix nodes determining that it has the requested data and responsively sending the requested data to the consumer node identified in the blanket registration message.

These and other aspects and advantages of the exemplary embodiment will become apparent to those of ordinary skill in the art by reading the following detailed description, with reference where appropriate to the accompanying drawings.

BRIEF DESCRIPTION OF THE DRAWINGS

An exemplary embodiment of the present invention is described herein with reference to the drawings, in which.

DETAILED DESCRIPTION OF AN EXEMPLARY EMBODIMENT

1. System Overview

Figure 1:
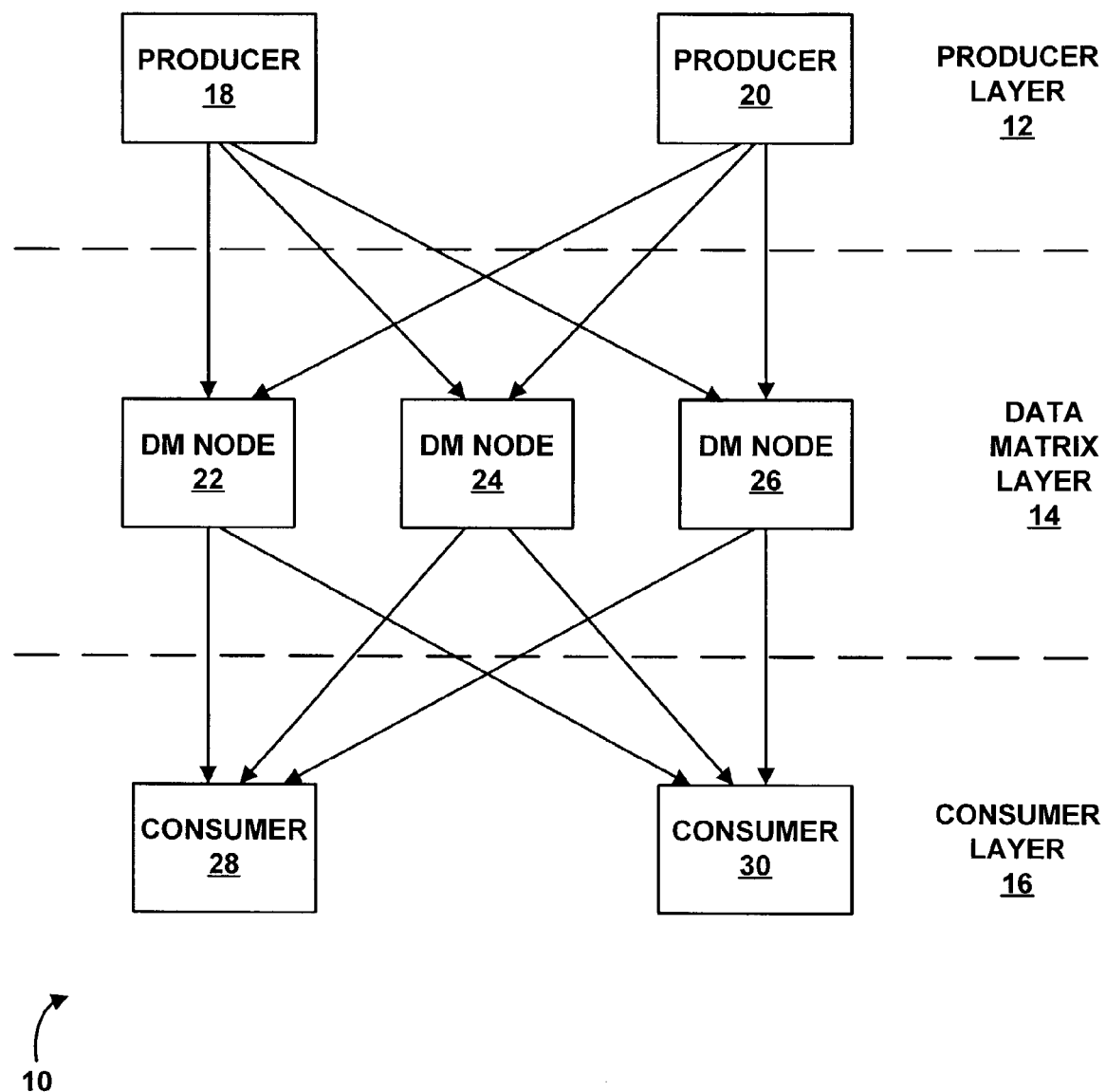
FIG. 1 is a schematic overview of a system arranged in accordance with the exemplary embodiment.

Referring to the drawings, FIG. 1 is a schematic overview of a system 10 arranged in accordance with the exemplary embodiment. The exemplary system is divided functionally into three layers, a producer layer 12, a Data Matrix layer 14, and a consumer layer 16.

For purposes of example, the producer layer 12 is shown to include two producer nodes (master data sources) 18, 20, the Data Matrix layer 14 is shown to include three Data Matrix host nodes (DM nodes) 22, 24, 26, and the consumer layer 16 is shown to include two consumer nodes 28, 30. Each of these layers, however, could equally include more or fewer nodes. Further, although the Data Matrix layer 14 is shown as a single layer of nodes, it could equally be more than one layer of nodes. In this regard, the Data Matrix layer 14 could be considered an abstract matrix layer that sits between the producer layer and the consumer layer.

Generally speaking, each producer node in producer layer 12 will produce and/or maintain one or more master databases, each of which may include a variety of data. Each producer node may instruct particular DM nodes in the Data Matrix layer 14 to maintain one or more subsets of that data, and/or to be prepared to receive certain data set updates. Thereafter, the producer node will multicast to those DM nodes an update-message that may carry multiple subsets of data, and each recipient DM node will take (trap) from that multicast message the subset(s) of data that it is instructed to maintain.

In parallel with this, each consumer node in consumer layer 16 can register with the Data Matrix by multicasting to all of the DM nodes in layer 14 a registration-message that indicates a request to receive a particular subset of data. Each DM node that has been instructed by a producer to maintain data that falls within that requested subset will then respond to the consumer node's registration. In particular, if the DM node has the requested data, then the DM node will send it to the requesting consumer node. Further, the DM node will maintain a record of the registration, and each time the DM node receives data that falls within the requested subset (or at scheduled times), the DM node will send that data along to the requesting consumer node, to keep the consumer node updated.

With this arrangement, the Data Matrix layer 14 becomes a virtual database, with a virtual database schema, that can serve data to consumer nodes. Advantageously, producer nodes 18, 20 then have no need to know how many consumer nodes are present, what specific data the consumer nodes need, or what database schema is maintained by each consumer node. In practice, a producer node can simply multicast data to the Data Matrix 14, and one or more DM nodes can then serve particular data on consumer nodes.

Further, consumer nodes 28, 30 have no need to know what producer nodes are present, what DM nodes are present, or what database schema is maintained by any producer or DM node. In practice, a consumer node can simply register with the Data Matrix to receive certain datasets, and one or more DM nodes can then responsively serve data to the consumer node.

2. Example Operation

Figure 2:
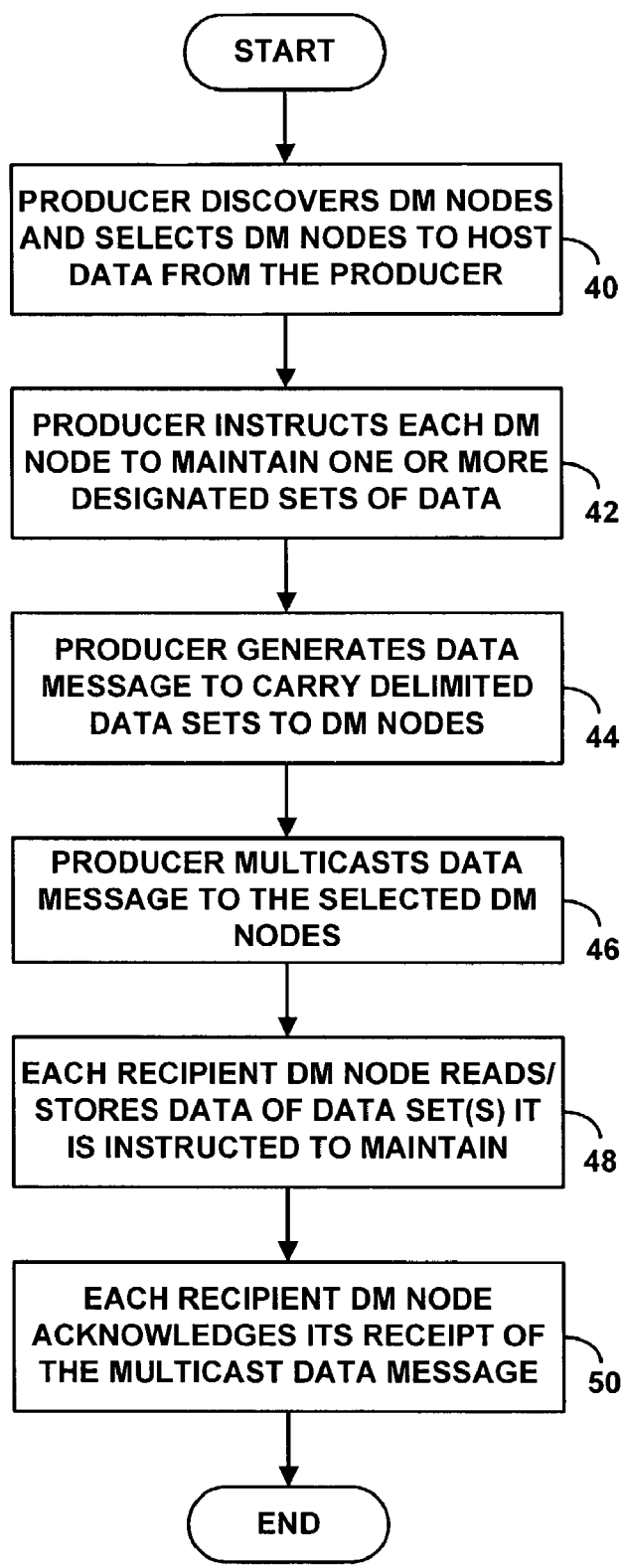
FIG. 2 is a flow chart depicting how a producer layer can populate a Data Matrix layer in accordance with the exemplary embodiment.
Figure 3:
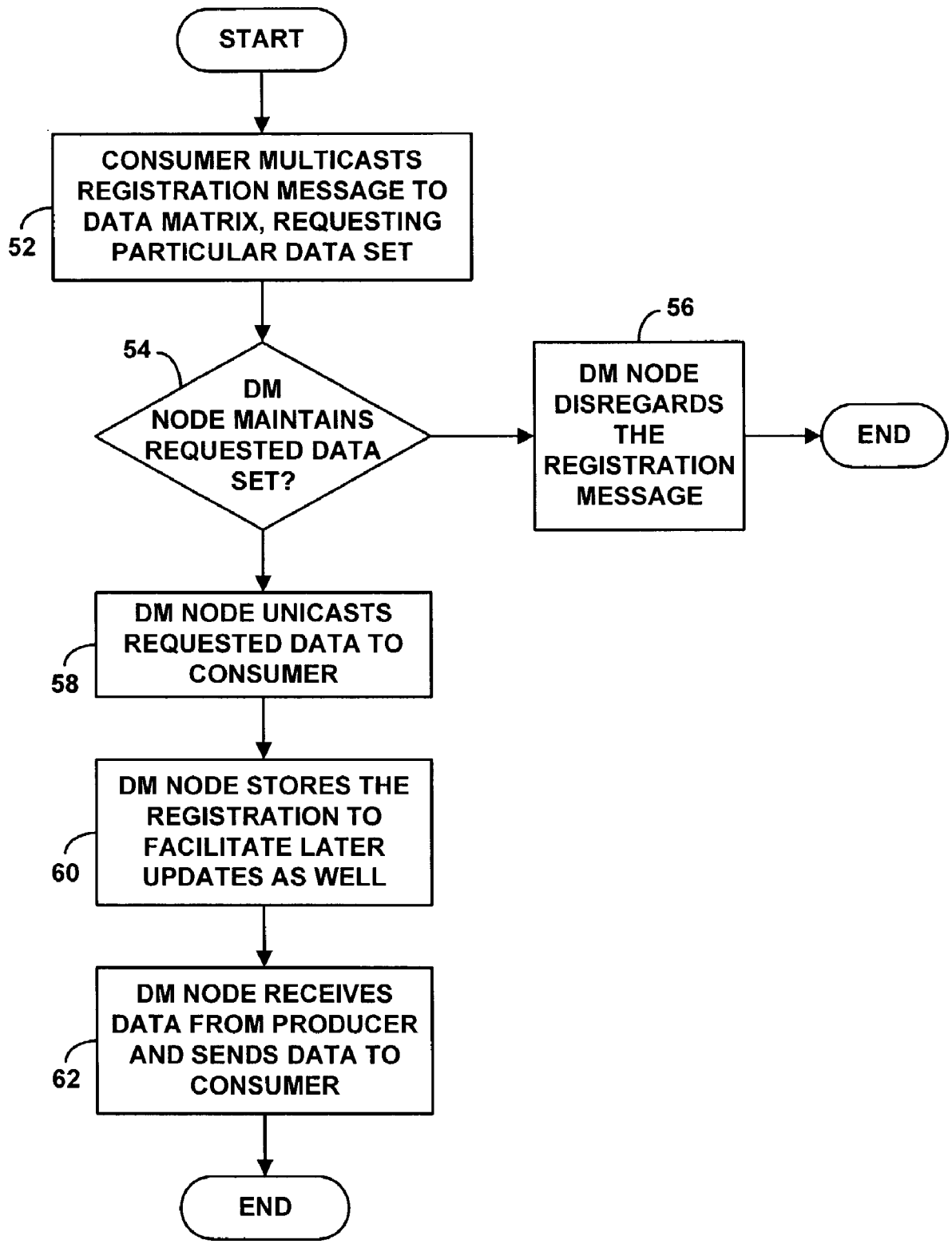
FIG. 3 is a flow chart depicting how a Data Matrix layer can serve data to a consumer layer in accordance with the exemplary embodiment.

FIG. 2 is a flow chart depicting example process steps that can be involved in populating the Data Matrix 14 with data (new data and/or updates or changes to data) from producer layer 12, and FIG. 3 is a flow chart depicting example process steps that can be involved in distributing data from the Data Matrix 14 to the consumer layer 16. It should be understood, however, that the data sets and particular distribution discussed here, as well as the specific processes depicted, are purely exemplary. Many variations are possible, within the scope of the claimed invention.

Figure 4:
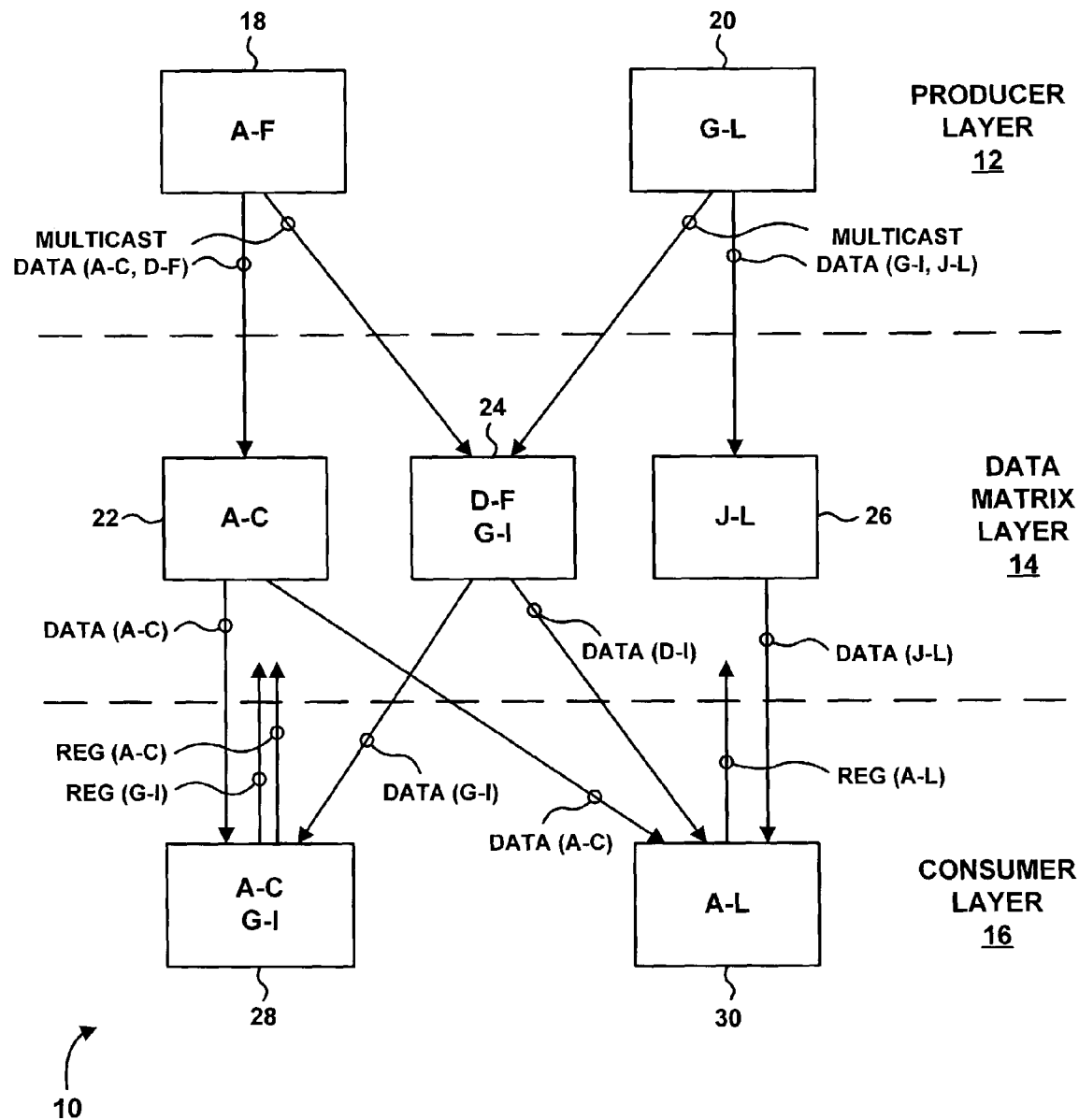
FIG. 4 is the schematic overview of FIG. 1, with labels showing example data allocation.

For purposes of this example, assume that producer 18 maintains a database in which each record has fields A through F, and producer 20 maintains a database in which each record has fields G through L. FIG. 4 depicts this arrangement, with the letters "A-F" in producer node 18 and the letters "G-L" in producer node 20.

a. Populating the Data Matrix

As shown in FIG. 2, at block 40, each producer will initially engage in a process to learn which DM nodes are present in the Data Matrix 14 and to select certain DM nodes that the producer will populate with data.

In the exemplary embodiment, to be able to determine which DM nodes are present in the Data Matrix, each producer will maintain or have access to the IP addresses of all DM nodes in the Data Matrix. The producer may then serially ping each of the DM nodes and conclude that a given DM node is present if the DM node responds to the ping request. The producer may thereby compile in data storage a list of the DM nodes that are present.

Given the list of DM nodes that are present, the producer may then select a number of those DM nodes to hold (host) a replica of data provided by the producer. The number of nodes that the producer selects can be set in advance through a standard user interface or can be chosen in any other manner. Further, the process of selecting which DM nodes to use could involve receiving performance updates periodically from the DM nodes and selecting those DM nodes that currently have the lightest load or satisfy other threshold parameters. A producer could also be programmed to change its allocation of data among DM nodes from time to time, if desired.

For purposes of example, assume that producer 18 selects DM nodes 22 and 24 to hold its data, and that producer 20 selects DM nodes 24 and 26 to hold its data. More particularly, for example, assume that (i) producer 18 will use DM node 22 to hold a replica of data in fields A through C, (ii) producer 18 will use DM node 24 to hold a replica of data in fields D through F, (iii) producer 20 will use DM node 24 to hold a replica of data in fields G through I, and (iv) producer 20 will use DM node 26 to hold a replica of data in fields J through L. FIG. 4 depicts this exemplary allocation, with data sets labeled accordingly ("A-C", "D-F", "G-I" and "J-L") in nodes 22, 24 and 26.

(Note that in an alternative embodiment, a producer could be directly programmed or otherwise instructed which DM nodes to use, instead of engaging in a dynamic discovery process to identify and select DM nodes. For instance, an administrator could configure the producer through a user interface.)

In turn, at block 42, each producer instructs its selected DM nodes to maintain certain sets of data. Thus, in the example of FIG. 4, (i) producer 18 would instruct DM node 22 to maintain data set A-C, (ii) producer 18 would instruct DM node 24 to maintain data set D-F, (iii) producer 20 would instruct DM node 24 to maintain data set G-I, and (iv) producer 20 would instruct DM node 26 to maintain data set J-L.

To instruct a DM node to maintain (host) a particular data set, a producer may send a message to the DM node, instructing the DM node to listen to a particular multicast IP address, and giving the DM node the name of the data set that it should maintain. This message may be referred to as a "DMBIND" message. For instance, producer 18 might send a DMBIND message to DM node 22, instructing DM node 22 to listen to multicast IP address "X", and giving DM node 22 a name or other identifier of data set "A-C" (i.e., fields A through C). Producer 18 may further send a DMBIND message to DM node 24, also instructing DM node 24 to listen to multicast address X, but giving DM node 24 a name or identifier of data set "D-F" (i.e., fields D through F).

Similarly, producer 20 may send a DMBIND message to DM node 24, instructing DM node 24 to listen to multicast IP address "Y", and giving DM node 24 the name of data set "G-I" (i.e., fields G through I). And producer 20 may further send a DMBIND message to DM node 26, instructing DM node 26 to listen to multicast address Y, but giving DM node 26 the name of data set "J-L" (i.e., fields J through L).

Thereafter, when a DM node receives a multicast packet directed to a multicast address to which it was assigned to listen, the DM node will extract from the packet the data set that it has been instructed to maintain.

Alternatively, a DMBIND message could simply instruct a DM node to listen to a particular multicast address, without instructing the DM node to maintain a specific data set. In that event, the producer could later instruct the DM node to maintain a particular data set. At least for this reason, the producer will preferably maintain a record of which DM nodes the producer will have maintain which of its data sets. (Again, this allocation could be user-configured or established programmatically.)

In the exemplary embodiment, in response to DMBIND message, a DM node will not formally register as a member of a multicast group having the multicast address to which it is instructed to listen. Instead, routers (not shown) in the Data Matrix layer 14 will be set with static routing paths to route multicast packets to all DM nodes within the Data Matrix, and a DM node will pay attention to only those multicast packets destined to the multicast address to which it is instructed to listen.

In an alternative embodiment, however, DM nodes could be made to respond to a DMBIND message by registering as members of the designated IP multicast group (IPMG) using the well known Internet Group Management Protocol (IGMP). In that event, routers in the Data Matrix 14 could be set to dynamically route multicast-packets to members of a given IPMG, as is conventionally done with multicast communications.

At block 44, in response to a change in data (e.g., addition, deletion or modification of data) at a producer, or for any other designated reason (e.g., at periodic intervals), a producer may then send a data update message to each of the DM nodes that have been selected to host the data. To do this, in the exemplary embodiment, the producer will generate a message, referred to as a "DMDATA" message, that carries a latest data replica or an indication of the change in data (e.g., a change-instruction). And, at block 46, the producer would multicast the DMDATA message to the multicast address to which DM nodes maintaining that data were instructed to listen.

Preferably, the DMDATA message can take the form of a packet having a header section that bears the multicast address and having a payload section that carries multiple data sets (i.e., replicas of entire data sets or subsets thereof, or change instructions) and, for each data set, a specification that tells a recipient DM node whether to take and store the data set. The specifications for all of the data sets in the packet could be set forth in a group separately from the data sets, e.g., preceding all of the data sets. Alternatively, in the exemplary embodiment, each specification could take the form of a delimiter that precedes (or is otherwise set forth in conjunction with) its respective data set in the payload section. Each such delimiter can take various forms.

As an example, each delimiter could be a data-set name, so that a recipient DM node that had been instructed to maintain that designated data set would know to take the data that follows the delimiter. For instance, if producer 18 has new records with fields A through F, it might multicast to IPMG X (i.e., transmit to multicast IP address X) a packet that carries as payload the following delimited segments:

1. Message type: DMDATA
2. Delimiter: Data Set "A-C"
3. Data Set update: update records reflecting changes in fields A through C
4. Delimiter: Data Set "D-F"
5. Data Set update: update records reflecting changes in fields D through F Similarly, if producer 20 has new records with fields G through L, it might send to IPMG Y (i.e., transmit to multicast IP address Y) a packet that carries as payload the following delimited segments:

1. Message type: DMDATA
2. Delimiter: Data Set "G-I"
3. Data Set update: update records reflecting changes in fields G through I
4. Delimiter: Data Set "J-L"
5. Data Set update: update records reflecting changes in fields J through L As another example, the delimiter could be a DM node identifier (e.g., the name or IP address of a given DM node), and a recipient DM node would know to take the data that follows its identifier. For instance, if producer 18 has an update regarding records with fields A through F, in the example above, it might send to IPMG X a packet that carries as payload the following delimited segments:

1. Message type: DMDATA
2. Delimiter: DM node 22
3. Data Set update: update records reflecting changes in fields A through C
4. Delimiter: DM node 24
5. Data Set update: update records reflecting changes in fields D through F And if producer 20 has an update regarding records with fields G through L, it might send to IPMG Y a packet that carries as payload the following delimited segments:

1. Message type: DMDATA
2. Delimiter: DM node 24
3. Data Set update: update records reflecting changes in fields G through I
4. Delimiter: DM node 26
5. Data Set update: update records reflecting changes in fields J through L Note that there could be some overlap between the data sets in a DMDATA message and in the data sets maintained by various DM nodes. The data sets do not need to be mutually exclusive. For instance, a given producer node could designate two or more DM nodes to maintain the same data set or subset thereof.

Thus, generally speaking, each data set could be a subset of the payload data that is carried by a DMDATA packet, and each delimiter could define for a given data set a subset of DM nodes (i.e., one or more DM nodes) that should receive and store the data set. As such, the combination of delimiters in a given DMDATA message could be considered a specification that indicates generally which DM nodes are to take which data sets from the message.

Further, note that a given DMDATA packet could contain a mixture of delimiter types, such as some data set identifiers and some DM node identifiers, for instance.

Continuing with reference to FIG. 2, at block 48, each DM node that had been instructed to listen to the multicast address to which a DMDATA message was sent will then receive (detect) and read the DMDATA message and extract from the message the data set(s) that it is instructed to maintain (assuming the message includes applicable updates for that DM node). (On the other hand, each DM node that had not been instructed to listen to that multicast address would preferably ignore the message, just as any node would ignore a packet destined to an IP address not assigned to the node.)

For instance, if producer 18 multicasts a DMDATA message to multicast address X, DM nodes 22, 24 would read the message, because they had been instructed to listen to that multicast address. If DM node 22 is instructed to maintain data set A-C, then DM node 22 would extract any data updates designated in the DATA message as a member of data set A-C (e.g., by a suitable delimiter). Alternatively or additionally, if the DATA message sets forth data updates designated for DM node 22 (again, by a suitable delimiter), then DM node 22 would extract such data updates.

Similarly, if DM node 24 is instructed to maintain data set D-F, then DM node 24 would extract any data updates designated in the DMDATA message as a member of data set A-C (e.g., by a suitable delimiter). Alternatively or additionally, if the DMDATA message sets forth data updates designated for DM node 24 (again, by a suitable delimiter), then DM node 24 would extract such data updates.

A similar process could apply for a DMDATA from producer 20, which would be directed to multicast address Y and read by DM nodes 24 and 26.

Generally speaking, multicasting under the industry standard Internet Group Management Protocol (IGMP) does not provide for guaranteed delivery of multicast messages. Members of the IP multicast group (IPMG) may or may not actually receive the message, and the sender would not know. For data distribution, that can be a problem. Therefore, according to the exemplary embodiment, at block 50, each DM node that receives a multicast message will preferably respond to the message by sending an acknowledgement or "DMACK" message to the sender.

Further, when a DM node receives a DMBIND message instructing it to maintain a certain data set and/or when the DM node receives a first DMDATA message that instructs it to maintain a certain data set, the DM node will preferably reserve storage space to maintain the designated data set, if it does not already have space set aside to hold the data. For instance, applying techniques well known in the art, the DM node could programmatically create a table for storing records having the fields in the designated data set.

In this regard, each DM node would preferably be equipped with a data set definition table that indicates what fields fall within what data sets (by name), so that the DM node can set up a suitable table when instructed to maintain a given data set. For instance, when a DM node is instructed to maintain a data set named "A-C", the node may refer to its data set definition table to determine that such a data set has fields A, B and C (and, perhaps, to determine the type of each field), so that the DM node can establish an appropriate table (or set of tables) to hold that data set.

b. Distributing Data from the Data Matrix to Consumer Nodes

Turning next to FIG. 3, at block 52, a consumer node may multicast one or more registration or "DMREG" messages into the Data Matrix 14, as a request to receive updates of one or more particular data sets.

For instance, as shown in FIG. 4, consumer node 28 might be an application that uses or hosts data falling within fields A through C and within fields G through I, and consumer node 30 might be an application that uses or hosts data falling within fields A through L. To maintain up to date replicas of this data, consumer node 28 might send two DMREG messages into the Data Matrix 14, one requesting updates of data set A-C, and the other requesting updates of data set G-I. And consumer node 30 might send a single DMREG message into the Data Matrix, requesting updates of data set "A-L".

Preferably, each DMREG message will identify the requesting consumer node (by any predefined identifier) and will specify the requested data set by name or in some other fashion (such as by a set of fields, for instance).

In the exemplary embodiment, all of the DM nodes in the Data Matrix 14 will be registered as members of a particular multicast group having an associated multicast address, for purposes of receiving such DMREG messages. A consumer node may thus multicast a DMREG message to that multicast address, and all of the DM nodes would receive the message. (This process may also be referred to as "broadcasting" the DMREG message into the Data Matrix or sending a "blanket registration" into the Data Matrix, since the message would be received by all of the DM nodes.) Alternatively, fewer than all of the DM nodes could be members of the multicast group.

At block 54, when each given DM node receives the DMREG message, the DM node will determine whether it maintains the requested data set (in whole, or any subset thereof). For instance, if the DM node had received a DMBIND or DMDATA message instructing the DM node to maintain the data set or some subset thereof, then the DM node may conclude that it maintains the data set. On the other hand, if the DM node had not received a DMBIND or DMDATA message instructing it to maintain the data set or some subset thereof, then it may conclude that it does not maintain the data set.

In this regard, a data set requested by a consumer node could consist of the same set of fields as a data set maintained by a DM node, or it could be a subset or a superset of the requested data set. Exemplary DM nodes would allow for either case.

For example, if a DM node maintains data set A-C (records with fields A through C) and a consumer requests a data set A-B (records with fields A and B), then the DM node could programmatically conclude that it maintains the requested data set. As another example, if a DM node maintains data sets "D-F" and "G-I" and a consumer node requests updates of a data set defined to cover fields D, H and I, then the DM node may similarly conclude that it maintains the requested data set, since the set of fields D, H and I is a subset of the data sets maintained by the DM node. And as yet another example, if a DM node maintains data set A-C and a consumer requests data set A-L, the DM node could conclude that it maintains at least subset B-C of what was requested.

Thus, referring to FIG. 4, for instance, when consumer node 28 multicasts a DMREG message into the Data Matrix requesting data set A-C, DM node 22 would receive the message and would conclude that it maintains the requested data set (since it had received a DMBIND message instructing it to maintain the data set). On the other hand, each of DM nodes 24 and 26 would receive the multicast DMREG message as well and would conclude that they do not maintain the requested data set (since they had not received a DMBIND message or DMDATA message instructing them to maintain the data set).

By the same token, when consumer node 30 multicasts a DMREG message into the Data Matrix requesting data set A-L, DM nodes 22, 24 and 26 would all receive the message and would each conclude that they have a subset of the requested data set. Namely, (i) DM node 22 would conclude that it has subset A-C, (ii) DM node 24 would conclude that it has a subset D-I, and (iii) DM node 26 would conclude that it has a subset J-L.

If a DM node determines that it does not maintain the requested data set, then, at block 56, the DM node would preferably disregard the DMREG message (i.e., would not respond to it). Thus, DM nodes 24 and 26 would each disregard a DMREG message that consumer node 28 sends seeking data set A-C, since neither node 24 nor node 26 maintains data set A-C or a subset thereof. Similarly, DM nodes 22 and 26 would each disregard a DMREG message that consumer node 28 sends seeking data set G-I, since neither node 22 nor node 26 maintains data set G-I or a subset thereof.

On the other hand, if a DM node determines that it does maintain the requested data set, then, at block 58, the DM node would respond to the requesting consumer node with a DMDATA message that carries any data (or any incremental data update) that the DM node has, that falls within the requested data set. As shown in FIG. 4, for instance, in response to a DMREG message from consumer node 28 that seeks data set A-C, DM node 22 would send a DMDATA message to consumer node 28 providing the requested set of data. And as another example, in response to a DMREG message from consumer node 30 that seeks data set A-L, (i) DM node 22 would send a DMDATA message to consumer node 30, providing data set A-C, (ii) DM node 24 would send a DMDATA message to consumer node 30, providing data set D-I, and (iii) DM node 26 would send a DMDATA message to consumer node 30, providing data set J-L.

When a DM node receives a DMREG message requesting data that the DM node maintains, the DM node will further store the DMREG message (or an indication thereof) for later reference, as indicated at block 60 in FIG. 3. Thereafter, when the DM node receives another DMDATA message from a producer node, carrying the data requested by the DMREG message, the DM node will responsively send the data to the requesting consumer node, as shown at block 62. Thus, a continued flow of data occurs from producer, to Data Matrix, to consumer.

3. Component Architecture

Each node in system 10 (that is, each producer node, each DM node and each consumer node) can take various forms, and the nodes can differ in form from each other. By way of example, each node could be one or more programmed computers with network interface modules, and all of the nodes can be coupled to a common network (e.g., local area network (LAN), wide area network (WAN) or the like) so they can communicate with each other. Alternatively, producer layer 12 could reside on one network, Data Matrix layer 14 could reside on another network, and consumer layer 16 could reside on still another network, with the networks connected together through suitable firewalls or other channels. Other arrangements are also possible.

Figure 5:
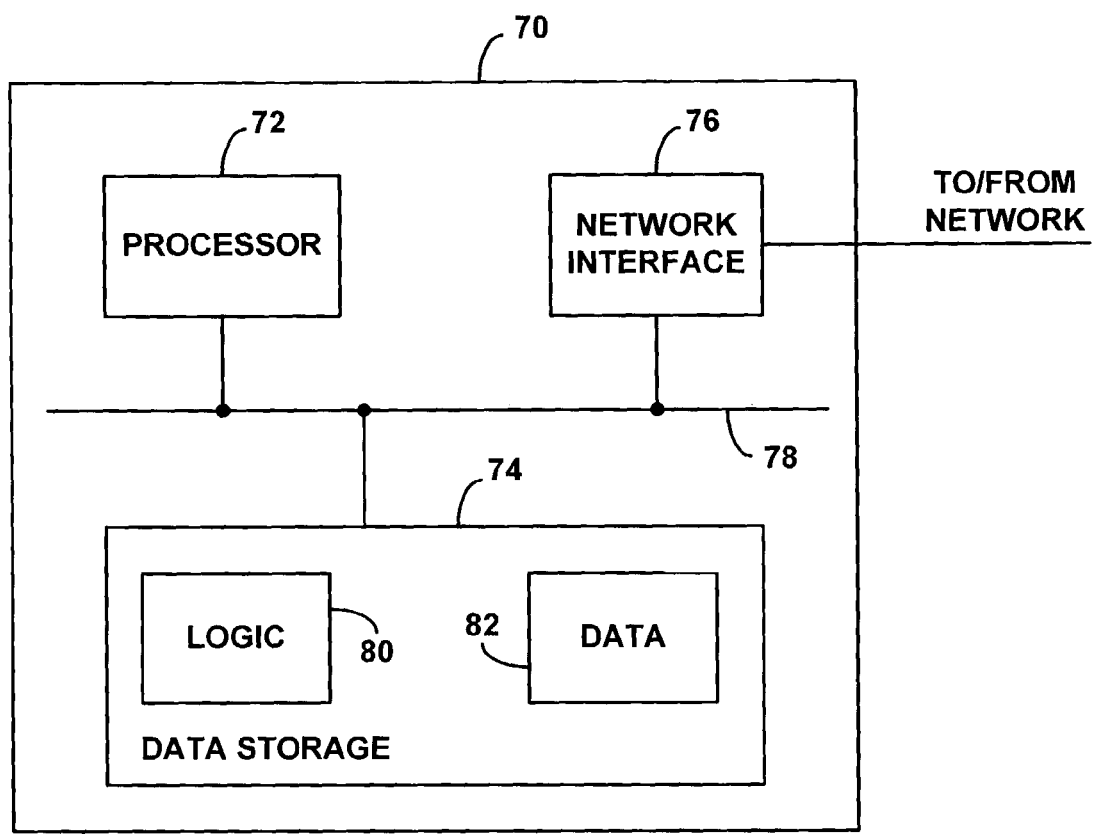
FIG. 5 is a block diagram of an exemplary node in the arrangement of FIG. 1.

By way of example, FIG. 5 depicts functional components of an exemplary node 70, which could be a producer node, DM node or consumer node. As shown in FIG. 5, the exemplary node includes a processor 72, data storage 74, and a network interface module 76, all of which may be coupled together by a system bus, network or other mechanism 78.

Processor 72 could be one or more general purposes processors (e.g., parallel processors) and/or dedicated processors (e.g., digital signal processors), such as those manufactured by Intel Corporation for instance. Data storage 74, in turn, may comprise volatile and/or non-volatile storage, such as RAM, ROM, disk or tape storage for instance.

In the exemplary embodiment, data storage 74 holds both logic 80 and data 82. The logic 80 could take the form of machine language instructions executable by processor 72 to carry out various instructions described herein. And the data 82 could be reference data that processor 72 uses to carry out those functions, as well as the database data that propagates through system 10 from producer layer 12 to consumer layer 16 in accordance with the exemplary embodiment. (Note that the logic employed by a given node could equally take the form of hardware, firmware and/or software.)

By way of example, each of the nodes in system 10 preferably supports network communications according to the well known Open Systems Interconnection (OSI) protocol. Thus, in each node, logic 80 would preferably define a protocol stack, including an application layer, a transport layer (e.g., UDP), a network layer (e.g., IP), a data link layer, and a physical layer (e.g., ATM).

Further, as will be described in the next section, each of the nodes preferably supports a "Data Matrix Transport Protocol" (DMTP) layer as well, which facilitates communication among the nodes using messages such as those described above. Thus, logic 80 in each node would also preferably define a DMTP message set and associated actions.

Still further, each node in system 10 preferably includes a database application suitable for maintaining data in some sort of structured form. Examples of suitable database applications include Oracle and SQL. Thus, logic 80 would preferably define the database application, and data 82 would comprise the data maintained by the database application. Those skilled in the art will appreciate that a database application can take many different forms. Therefore, in the exemplary embodiment, the database is not restricted to any particular form.

Additionally, each node is preferably equipped with data that indicates data set names and corresponding fields (parameters) that fall within each data set. Thus, data 82 in each node might comprise a table that correlates data set name with field names. For instance, (i) the table might indicate that data set "A-C" is made up of records with fields A, B and C, and (ii) the table might indicate that data set "G-I" is made up of records with fields "G, H and I". This table might be maintained by the database application on the node.

As yet another example, each DM node in system 10 preferably supports the well known IGMP (as defined, for instance, by Deering et al., "Host Groups: A Multicast Extension to the Internet Protocol," Request For Comments 966), to be able to register as a member of one or more multicast groups and to receive multicast messages destined to such groups. Thus, logic 80 in each DM node would preferably include program instructions executable by the processor to conventionally support that protocol as well.

And as still another example, each producer node is preferably equipped with data indicating the IP addresses of all DM nodes in Data Matrix 14, so as to be able to discover which DM nodes are available, by pinging them for instance. And each producer node is also preferably equipped with data indicating one or more multicast IP addresses that the producer can use for distributing data in the Data Matrix 14. Thus, data 82 in each producer node may include a record of these IP addresses.

Similarly, each consumer node is preferably equipped with data indicating a Data Matrix multicast address, to which the consumer node can multicast registration messages seeking designated data sets. Thus, data 82 in each consumer node preferably includes an indication of that multicast address.

Further, each consumer node is preferably programmed with logic to be able to convert data that it receives from the Data Matrix 14 into another format. For instance, if a DM node serves a particular data set to a consumer node, the consumer node might then translate certain fields of the data set into fields of records that the consumer node maintains. Logic 80 in each consumer node thus preferably includes program instructions to perform any desired data conversion.

Network interface module 76, in turn, can vary in form depending on network connectivity requirements. As examples, it could be an Ethernet network interface card that provides landline network connectivity, or it could be an 802.11x network interface card that provides wireless network connectivity. Other examples are possible as well.

4. Data Matrix Transport Protocol

As noted above, each of the nodes in system 10 complies with the DMTP (Data Matrix Transport Protocol), which defines messages that the nodes can exchange with each other in order to facilitate the exemplary distribution of data. In the exemplary embodiment, the DMTP defines the DMBIND, DMACK, DMREG and DMDATA messages that were discussed in the Example Operation section above. Thus, each node in system will preferably be programmed with logic to generate, send, receive and/or interpret these messages, as appropriate.

These DMTP messages are summarized in the following four paragraphs for convenience, and to provide further details.

The DMBIND message is used to notify a multicast group that the producer application named in the message body exchanges data over the multicast address that is also specified in the message. The DMBIND message may specify (i) a name and ID of the producer database being bound to the multicast group, (ii) a data set name that the recipient DM node is instructed to maintain and (iii) an IP multicast group (multicast address) to which the recipient DM node is instructed to listen, as well as other parameters.

The DMACK message is the application level response returned by a DM node when a command is received. In the exemplary embodiment, multicast group members should acknowledge transactions. Therefore, for a multicast command to N nodes in an IPMG, there should be N DMACK responses. The DMACK message may specify (i) a node ID, IP address and one or more multicast address of the responding node, and (ii) the ID of the sending node, as well as other parameters.

The DMREG message is sent to all nodes in the Data Matrix 14 by a consumer node and is used to request updates of a data set specified in the message. The DMREG message will be sent to a multicast address to which all of the DM nodes have registered (with dynamic routing to the nodes) or to which all of the DM nodes are otherwise programmed to listen (with static routing to the nodes). In the exemplary embodiment, the DMREG message may specify (i) a name and ID of the sending consumer node and (ii) the name of a data set being requested, as well as other parameters.

The DMDATA message is used to transport data from the producer layer 12 to the Data Matrix layer 14 and from the Data Matrix layer 14 to the consumer layer 16. In the exemplary embodiment, the DMDAT message is the only message used for data transport. However, other messages could be used as well if desired. The DMDATA message may specify the name and ID of the sending node and, as described above, would preferably set forth data with delimiters that can be used by one or more recipient nodes to determine which data to trap. Further, the DMDATA message may contain other parameters as well.

In the exemplary embodiment, the DMTP may also define other messages, or variations on the messages above. For instance, the DMTP may also define a "DMERR" message that can be sent to specify an error condition, a "DMDREQ" message that can be used like the DMREG to request certain data, and a "DMSTAT" message that can be used to request performance statistics (such as to determine current loads on DM nodes). Further, in the exemplary embodiment, DMTP messages that pass between nodes may be secured with a suitable key exchange.

5. Example Applications

The exemplary embodiment can help replicate data in many scenarios. As a specific example, the exemplary embodiment can be used to distribute registration, presence, and buddy list information from a main data store to application servers that host instant chat services, such as instant messaging (IM) and push-to-talk (PTT) service.

For instance, a producer node could maintain a master database that indicates group lists, and the producer could populate the Data Matrix 14 with that data. A PTT application server, as consumer node, could then register with the Data Matrix to learn when changes occur in the group lists. Similarly, an IM server, as consumer node, could also register with the Data Matrix to learn when changes occur.

At the same time, another producer node could maintain subscriber service provisioning information, indicating what users and/or devices are entitled to engage in what sorts of service (such as PTT or IM, for instance). The producer may similarly populate the Data Matrix with that data, and the PTT application server and IM application server may also register with the Data Matrix to learn of changes in that data as well.

As still another example, a producer node could maintain presence information, such as an indication of when particular subscribers are online and available to communicate. Such a producer may populate the Data Matrix with that presence information, and the PTT application server and IM application server may similarly register with the Data Matrix to learn of changes in presence status of various subscribers. Other examples are possible as well.

6. Conclusion

An exemplary embodiment of the present invention has been described above. Those skilled in the art will understand, however, that changes and modifications may be made to this embodiment without departing from the true scope and spirit of the present invention, which is defined by the claims.

We claim:

1. A data distribution system comprising:
    a producer layer comprising a number of producer nodes, each having an associated processor; and
    a data matrix layer comprising a plurality of data matrix nodes, each having an associated processor and data storage, wherein each data matrix node receives data sets from the producer layer and stores the data sets in the data storage of the data matrix node,
    wherein a given one of the producer nodes sends respectively to each data matrix node of a subset of the plurality of data matrix nodes a bind message that instructs the data matrix node to listen to a particular multicast address and that gives the data matrix node an identifier of a data set that the data matrix node should maintain, wherein the bind message to a first data matrix node instructs the first data matrix node to listen to the particular multicast address and gives the first data matrix node an identifier of a first data set that the first data matrix node should maintain, and wherein the bind message to a second data matrix node instructs the second data matrix node to listen to the particular multicast address and gives the second data matrix node an identifier of a second data set that the second data matrix node should maintain, wherein the first data set differs from the second data set,
    wherein after sending the bind messages, the given producer node transmits an update message to the particular multicast address for receipt by the data matrix nodes of subset, wherein the update message carries a plurality of data sets and specifies, respectively for each data set of the plurality of data sets, an identifier of the data set with or without also identifying one or more recipient data matrix nodes for the data set, and
    wherein each data matrix node of the subset receives the update message transmitted to the multicast address and, for at least one data set in the update message, (i) makes a determination of whether the identifier that the update message specifies for the data set matches an identifier provided to the data matrix node by a bind message as an indication that the data matrix node should maintain the data set, and (ii) takes and stores the data set if the determination is that the identifier that the update message specifies for the data set matches an identifier provided to the data matrix node by a bind message as an indication that the data matrix node should maintain the data set.

2. The data distribution system of claim 1, wherein each identifier of a data set is a name of the data set.

3. The data distribution system of claim 1, further comprising:
    a consumer layer comprising a number of consumer nodes, wherein each consumer node multicasts a registration message to the data matrix nodes, seeking given data, and wherein each data matrix node that has received at least a subset of the given data from a producer node responsively sends at least the subset of the given data to the consumer node, and
    wherein all of the data matrix nodes listen for packets sent to a multicast group address, wherein each consumer node multicasts the registration message to the data matrix nodes by sending the registration message to the multicast group address so that the data matrix nodes will receive the registration message.

4. The data distribution system of claim 3, wherein at least one data matrix node stores an indication that a given consumer node has requested the given data and, upon subsequently receiving further data from the producer layer, determines that the further data falls within the given data and responsively sends the further data to the given consumer node.

5. The data distribution system of claim 1, wherein the number of producer nodes is a plurality of producer nodes, and the number of consumer nodes is a plurality of consumer nodes.

6. The data distribution system of claim 1, wherein at least one of the data sets comprises data for use by an application server selected from the group consisting of (i) a push-to-talk application server and (ii) an instant messaging application server.

7. A producer node comprising:
    a processor;
    data storage;
    machine language instructions stored in the data storage and executable by the processor to perform functions comprising:
        sending respectively to each of a plurality of data matrix nodes a bind message that instructs the data matrix node to listen to a particular multicast address and that gives the data matrix node an identifier of a data set that the data matrix node should maintain, wherein the bind message to a first data matrix node instructs the first data matrix node to listen to the particular multicast address and gives the first data matrix node a first identifier of a first data set that the first data matrix node should maintain, and wherein the bind message to a second data matrix node instructs the second data matrix node to listen to the particular multicast address and gives the second data matrix node a second identifier of a second data set that the second data matrix node should maintain, wherein the first identifier differs from the second identifier and the first data set differs from the second data set, and after sending the bind messages, transmitting an update message to the particular multicast address for receipt by the data matrix nodes, wherein the update message carries a plurality of data sets and specifies, respectively for each data set of the plurality of data sets, an identifier of the data set with or without also identifying one or more recipient data matrix nodes for the data set, wherein the plurality of data sets includes the first data set and the second data set, and wherein the update message specifies for the first data set the first identifier so that the first data matrix node will take and store the first data set, and wherein the update message specifies for the second data set the second identifier so that the second data matrix node will take and store the second data set.

8. The producer node of claim 7, wherein each identifier of a data set is a name of the data set.

9. The producer node of claim 7, wherein at least one of the data sets comprises data for use by an application server selected from the group consisting of (i) a push-to-talk application server and (ii) an instant messaging application server.

\* \* \* \* \*